(12) United States Patent
Wright

(10) Patent No.: US 8,490,663 B2
(45) Date of Patent: Jul. 23, 2013

(54) REMOTELY OPERATED MOBILE CUTTING APPARATUS

(76) Inventor: Terrill W. Wright, Marlborough, MA (US)

( * ) Notice: Subject to any disclaimer, the term of this patent is extended or adjusted under 35 U.S.C. 154(b) by 361 days.

(21) Appl. No.: 12/322,797

(22) Filed: Feb. 6, 2009

(65) Prior Publication Data

US 2009/0205750 A1    Aug. 20, 2009

Related U.S. Application Data

(60) Provisional application No. 61/065,886, filed on Feb. 15, 2008.

(51) Int. Cl.
*A01G 23/08* (2006.01)
(52) U.S. Cl.
USPC .............................. 144/4.1; 83/928
(58) Field of Classification Search
USPC ....... 144/4.1, 34.1, 336; 30/379, 381; 83/574, 83/928
See application file for complete search history.

(56) References Cited

U.S. PATENT DOCUMENTS

| | | | | |
|---|---|---|---|---|
| 2,348,588 A * | 5/1944 | Arsneau | ...................... | 144/34.1 |
| 3,796,242 A * | 3/1974 | Albright | ...................... | 144/34.1 |
| 4,005,625 A | 2/1977 | Brochu et al. | .................. | 83/100 |
| 4,063,359 A | 12/1977 | Luscombe | ...................... | 30/379.5 |
| 4,239,067 A | 12/1980 | Mononen | ...................... | 144/2 Z |
| 4,261,105 A * | 4/1981 | Love | .................. | 30/383 |
| 4,524,519 A * | 6/1985 | Muehling | ...................... | 30/382 |
| 4,538,494 A * | 9/1985 | Wirfelt | .............. | 83/796 |
| 4,552,191 A | 11/1985 | Kuusilinna | ...................... | 144/3 D |
| 4,683,924 A | 8/1987 | Cornelius | ...................... | 144/3 D |
| 4,763,705 A | 8/1988 | Johnson | ...................... | 144/34 R |
| 4,848,424 A | 7/1989 | Wiemeri et al. | ............. | 144/34 R |
| 5,086,684 A | 2/1992 | Johnson | ...................... | 83/795 |
| 5,161,448 A * | 11/1992 | Wangsness | ...................... | 83/795 |
| 5,201,350 A | 4/1993 | Milbourn | ...................... | 144/2 Z |
| 5,542,326 A * | 8/1996 | Borgford | ...................... | 83/795 |
| 5,655,584 A | 8/1997 | Glawson | ...................... | 144/335 |
| 5,709,254 A | 1/1998 | Argue | ........................ | 144/34.1 |
| 5,944,077 A | 8/1999 | Henning et al. | ............ | 144/4.1 |
| 5,979,518 A * | 11/1999 | Hamby | ........................ | 144/34.1 |
| 6,408,906 B1 | 6/2002 | Moon et al. | ................ | 144/24.13 |
| 6,443,197 B2 | 9/2002 | Marttila et al. | ............. | 144/34.1 |
| 6,481,324 B1 | 11/2002 | Johnston | ...................... | 83/795 |
| 6,543,498 B1 | 4/2003 | Woodham | ...................... | 144/379 |
| 6,619,171 B2 | 9/2003 | Wade et al. | ..................... | 83/169 |
| 6,622,688 B2 | 9/2003 | Everts et al. | ............. | 123/195 R |
| 6,648,152 B2 | 11/2003 | Bermes | ........................ | 211/70.6 |
| 6,718,661 B1 | 4/2004 | Miller | ........................ | 37/403 |
| 6,901,978 B2 | 6/2005 | Simpson | ...................... | 144/339 |
| 6,968,877 B1 | 11/2005 | Stokkeland | ...................... | 144/4.1 |
| 7,025,251 B2 | 4/2006 | Woodham | ...................... | 234/38 |
| 7,152,640 B1 | 12/2006 | Williams | ...................... | 144/4.1 |
| 7,237,585 B2 | 7/2007 | McKnight | ...................... | 144/34.1 |
| 7,243,691 B1 | 7/2007 | Tesinsky | ...................... | 144/34.5 |
| 2006/0070246 A1* | 4/2006 | McKnight | ...................... | 30/296.1 |

* cited by examiner

*Primary Examiner* — Stephen Choi
(74) *Attorney, Agent, or Firm* — Robert M. Amici

(57) ABSTRACT

The present invention relates to a remotely operated cutting apparatus for cutting trees into logs. The cutting apparatus comprises a lift assembly, a chain saw assembly comprising a platform that is pivotally mounted to the lift assembly, and at least one force absorbing device fixedly attached to both the lift assembly and to the chain saw assembly.

13 Claims, 2 Drawing Sheets

REMOTELY OPERATED MOBILE CUTTING APPARATUS

CROSS-REFERENCE TO RELATED APPLICATIONS

This patent application claims the benefit of U.S. Provisional Patent Application No. 61/065,886, filed Feb. 15, 2008.

BACKGROUND OF THE INVENTION

1. Field of the Invention

The present invention relates to a remotely operated cutting apparatus comprising a chain saw that can be used for cutting logs.

2. Description of the Related Art

There are a variety of different types of manually operated power chain saws available for cutting trees into log size. However, since these are handheld, it is often difficult to use these saws for cutting a large number of trees quickly, especially if the trees have a wide diameter and/or are not easily accessible.

For this reason, many different non-handheld devices have been developed for making the job of cutting trees into logs easier. For example, devices for holding a chain saw that make it easier for the user to maneuver or operate the saw have been shown, including the mobile unit of U.S. Pat. No. 7,237,585 and the extension device of U.S. Pat. No. 6,622,688. Larger devices are also known. For example, U.S. Pat. Nos. 7,025,251 and 4,005,625 describe slashers in which several trees are fed to multiple saws which are then cut into log size. Also, saws such as those described in U.S. Pat. Nos. 6,619,171, 6,443,197, 5,944,077, 5,086,684, and 4,239,067, include a grapple-type mechanism for gripping or holding a tree in place while being sawed. Furthermore, U.S. Pat. Nos. 6,968,877, 6,718,661, 4,848,424, and 4,763,705 show cutting apparatuses that can be mounted onto vehicles or booms that can be attached to a vehicle and can be remotely operated. However, such devices are often mechanically complex and cannot be readily exchanged for other equipment useful in tree cutting operations.

Therefore, there is a need for a mobile apparatus that is useful for efficiently and effectively cutting trees into logs.

SUMMARY OF THE INVENTION

The present invention relates to a cutting apparatus comprising a lift assembly, a chain saw assembly, and at least one force absorbing device fixedly mounted to both. The lift assembly comprises an outer frame, a lifting device, and an optional cover plate. The chain saw assembly comprises a platform pivotally mounted to the lift assembly and further comprises a bar having an endless saw chain with cutting teeth on the chain, a motor driving the saw chain attached to the platform, and an optional housing covering the motor.

It is to be understood that both the foregoing general description and the following detailed description are exemplary and explanatory only and are intended to provide further explanation of the present invention, as claimed.

DETAILED DESCRIPTION OF THE INVENTION

Figure 1:
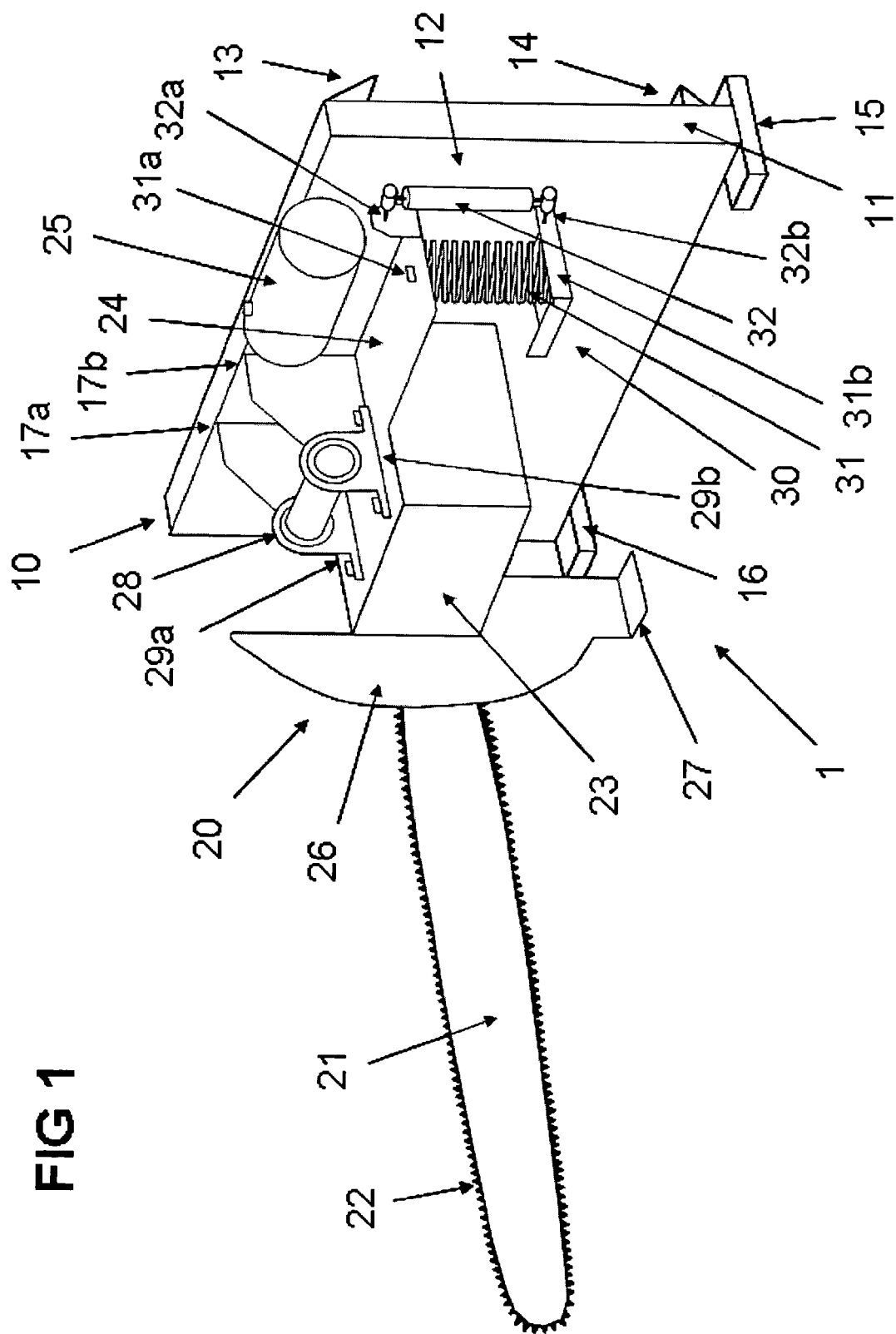
FIG. 1 shows an example of the cutting apparatus of the present invention.

The present invention relates to a cutting apparatus that can be lifted and remotely operated for cutting trees into shorter lengths, such as into logs for firewood.

The cutting apparatus of the present invention comprises a lift assembly, a chain saw assembly, and at least one force-absorbing device. The lift assembly comprises an outer frame, which provides structural rigidity to the assembly, enabling the cutting apparatus to be safely lifted off the ground. Additional frame supports may also be used to further strengthen the frame. Preferably the frame is rectangular or square and is also preferably made from steel. The frame may optionally be covered, such as with a steel plate. This provides additional rigidity and also provides a protective screen between the chain saw assembly, described in more detail below, and the user. Also, the frame may further comprise various stabilizing feet mounted to the bottom of the frame which enable the cutting apparatus to freely stand securely on the ground.

In addition, the lift assembly further comprises at least one lifting device, which is the means by which the cutting apparatus is lifted and transported to the desired location for cutting. A variety of different types of lifting mechanisms may be used, depending on the type of equipment being used for lifting. For example, the lifting device may be a plurality of brackets or fittings, such as handles, that are fixedly mounted along the frame of the lift assembly and to which a vehicle can connect or attach. Also, the lifting device can be an angular strip fixedly mounted to the frame, especially along the top of the frame, forming a gap that can be used to lift the apparatus. Multiple angular strips may also be used. Additional devices, such as latches, can also be fixedly mounted to the bottom of the frame. Used together, such lifting devices are particularly suited for use with a skidsteer, since this vehicle can be equipped with a quick connect attachment used for connecting to and lifting equipment such as buckets, forks, dozer blades, plows, and the like. Thus, the cutting apparatus of the present invention may be adapted for a variety of different vehicles by matching the lifting device to the lifting attachment of that vehicle.

The cutting apparatus of the present invention further comprises a chain saw assembly. This assembly comprises a bar having an endless saw chain with cutting teeth along the chain. Any type of chain saw bar may be used. For example, the bar may be between about 2 and about 6 feet long, preferably between about 3 and about 5 feet long, and more preferably between about 3 and about 4 feet long. Also, a variety of different saw chains can be used to fit the bar, and the teeth may be sharpened and shaped to any depth for improving the efficiency of cutting. The chain is driven by a motor. This can be any type of engine, including electric, gas or diesel powered, or hydraulic, but is preferably a hydraulic motor, and would include the associated hydraulic lines. The motor can be attached to a platform which is mounted to the lift assembly in such a way that the motor is held horizontally. The motor may optionally also be contained within a motor housing, to protect the engine as well as the user. In addition, the chain saw assembly may further comprise an oil reservoir, such as a tank, to keep the saw chain lubricated. The oil reservoir may be fixedly mounted to the platform or to the lift assembly.

The chain saw assembly is mounted to the lift assembly so that it can pivot upwardly in relation to the lift assembly. Any type of pivoting device or hinge known in the industry may be used. For example, the frame of the lift assembly can be vertically positioned, with the platform for the motor of the chain saw assembly mounted perpendicular to the frame and horizontal to the ground. In this way, the bar of the chain saw assembly will project out from the platform, away from the lift assembly. Mounted in this way, the chain saw assembly can be pivoted upwardly away from the lift assembly.

As such, when the cutting apparatus is lowered onto a tree for cutting, the force of the saw against the tree would cause the apparatus to pivot upward, making it difficult to effectively cut into the tree. For this reason, the cutting apparatus of the present invention further comprises as least one force absorbing device, which is fixedly mounted to both the lift assembly and to the chain saw assembly. Preferably, this device is fixedly mounted to the platform of the chain saw assembly. The force absorbing device provides the necessary counter resistance against the force of the saw against the tree and further provides consistent downward pressure enabling the saw chain to effectively slice through the tree. It has been found that, with the chain saw assembly fixedly (rather than pivotally) mounted to the lift assembly, the force of the saw against the tree combined with the cutting force produced by the saw chain as the cutting teeth of the chain work through the tree, causes the cutting apparatus to bounce severely, making cutting difficult and unsafe. Also, if the force is too great, it has been found that the chain saw assembly may also fracture. However, by pivotally mounting the chain saw assembly to the lifting assembly, and further mounting at least one force absorbing device fixedly to both, it has been found that the proper balance of forces can be achieved. The force absorbing device can be any device capable of providing sufficient pressure to keep the chain saw cutting through the tree while also absorbing the forces created by the cutting action, including for example, a heavy duty spring or shock absorber. Furthermore, multiple devices may also be used, and these can be the same or different.

The cutting apparatus of the present invention may further comprise a cutting guide, and this can be used to safely guide the chain saw assembly to and through the tree as it cuts. The cutting guide may be any shape but is preferably curved and can be fixedly mounted anywhere on the cutting apparatus. For example, the cutting guide can be mounted to the chain saw assembly, preferably near the base of the bar in order to protect the motor from being hit by the tree. The cutting guide can further comprise a stabilizer foot mounted to the bottom of the guide. This is particularly useful in combination with stabilizing feet mounted to the lift assembly, since this enables the cutting apparatus to stand upright, with the bar of the chain saw off the ground.

A specific example of the cutting apparatus of the present invention is shown in FIG. 1. The cutting apparatus, 1, comprises a lift assembly, 10, and a chain saw assembly, 20. The lift assembly comprises an outer frame, 11, and a covering plate, 12, and further comprises two types of lifting devices—an angular strip, 13, fixedly mounted to the top of the frame, and a latch, 14, fixedly mounted to the bottom of the frame. The lift assembly further comprises two stabilizing feet, 15 and 16. The chain saw assembly, 20, comprises a bar, 21, a saw chain, 22, and a motor contained within a housing cover, 23 which is fixedly mounted to a platform, 24. The chain saw assembly further comprises an oil reservoir, 25, mounted to the top of the lift assembly and a cutting guide, 26, mounted to the platform, which is curved in shape and comprises an additional stabilizing foot, 27.

The cutting apparatus of this example further comprises a pivoting hinge, 28, which is fixedly mounted to the lift assembly at points 17a and 17b and to the chain saw assembly at points 29a and 29b. Thus, the chain saw assembly is pivotally mounted to the lift assembly. The platform, 24, is not mounted to the lift assembly. Also shown in FIG. 1 are two force absorbing devices, a heavy duty spring, 31 and a shock absorber, 32. Both are fixedly mounted to the chain saw assembly and to the lift assembly. In particular, spring, 31, is mounted to the chain saw assembly at point 31a and to the lift assembly at point 31b while the shock absorbed is mounted to the chain saw assembly at point 32a and to the lift assembly at point 32b.

Figure 2:
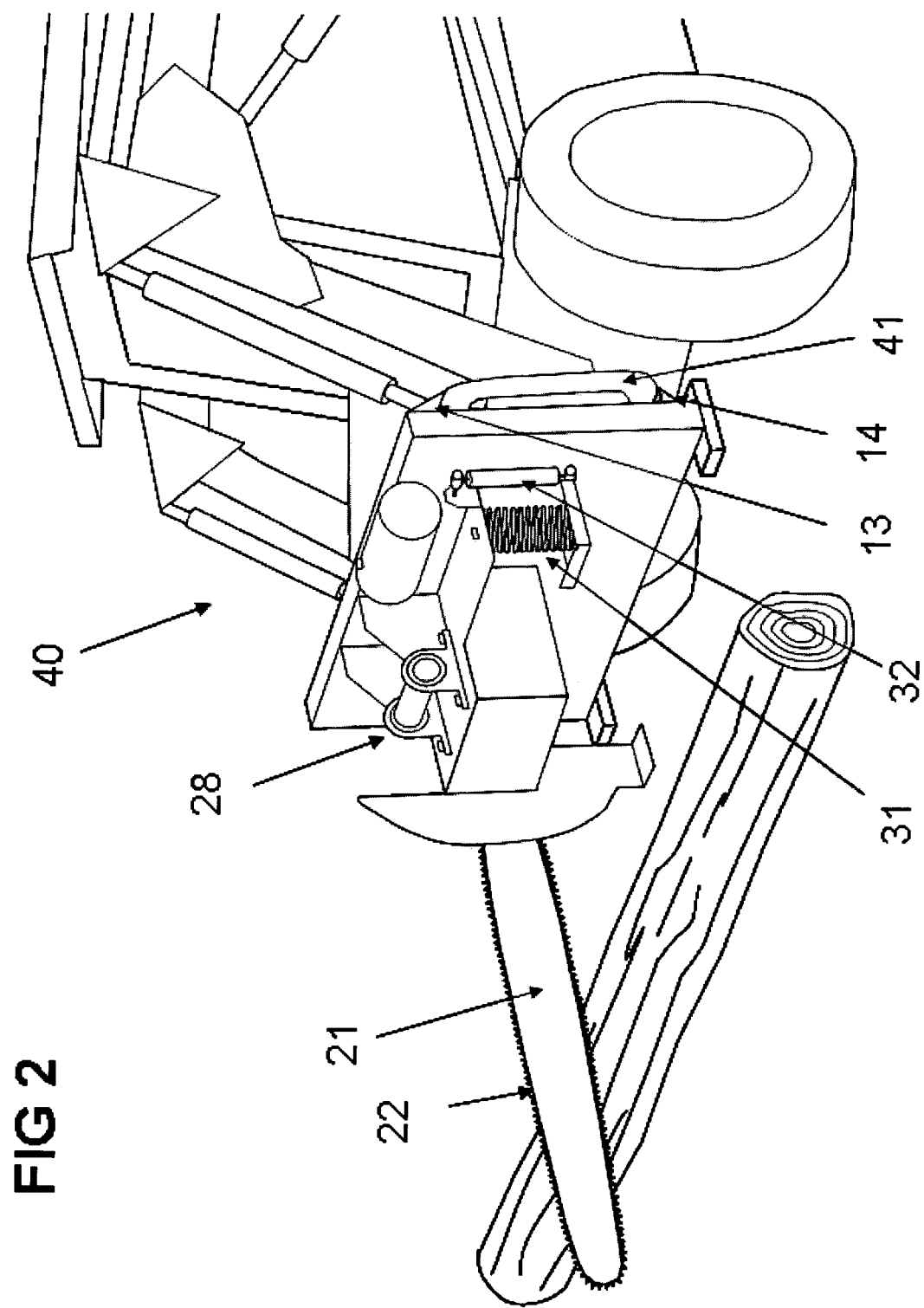
FIG. 2 shows an example of the use of the cutting apparatus of the present invention.

FIG. 2 shows how the cutting apparatus in FIG. 1 may be used. For this example, a skidsteer, 40, having a quick connect attachment, 41, can be used to lift the cutting apparatus using the gap formed by the angular strip, 13, and also using the latch, 14. As the cutting apparatus is lowered onto a tree, the saw chain, 22, cuts into the tree, causing the chain saw assembly to pivot upward at pivoting hinge, 28. The spring, 31, provides sufficient downward pressure to keep the bar, 21, and chain, 22, cutting through the tree. Shock absorber, 32, provides additional stabilization to keep the chain saw from bouncing as it cuts.

A particular advantage of the cutting apparatus of the present invention is the ease with which it can be lifted and transported to a location where a felled tree is to be cut into logs. Once a cut is made, the apparatus can then be easily and quickly repositioned along the tree to make additional cuts. All of the manipulating arms are a part of the vehicle holding the cutting apparatus. Thus, remote operation of this apparatus only requires knowledge of how to operate the vehicle. Furthermore, once a tree or multiple trees have been cut into logs, the cutting apparatus can then be readily disconnected from the vehicle, and a bucket or other desired equipment can then be attached. For example, a bucket may be used to pick up the logs for potential further processing or storage. Thus, the cutting apparatus of the present invention provides an efficient and effective means for an operator to cut trees into logs as well as perform addition operations, all from the same vehicle.

While, as discussed above, the chain saw assembly can be mounted to the lift assembly so that it can pivot upwardly, it is also possible to mount the chain saw assembly so that it pivots downwardly. If arranged in this way, rather than lowering the cutting apparatus onto a fallen tree, the cutting apparatus would be raised, thus cutting the tree from the bottom, which may be advantageous depending on where the tree is felled. For this arrangement, the force-absorbing device or devices would therefore be appropriately placed to provide sufficient upward pressure to keep the bar and chain cutting through the tree. Furthermore, it will be recognized that it is also possible to design the cutting apparatus to allow for both upward and downward pivoting of the chain saw assembly, using the appropriate combination and arrangement of pivoting device(s) and force-absorbing devices, which would allow for upward and downward cutting with this cutting device.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A tree or log cutting apparatus comprising;
   a) a lift assembly comprising an outer frame and at least one lifting device by which the cutting apparatus is lifted and transported by a vehicle to a location for cutting;
   b) a chain saw assembly comprising
      a bar having an endless saw chain with cutting teeth on the chain,
      a platform having a bottom, the platform pivotally mounted to the lift assembly, and
      a motor driving the saw chain attached to the platform, wherein the chain saw assembly is mounted perpendicular to the lift assembly with the bar projecting outwardly away from the lift assembly; and
   c) at least one force absorbing device fixedly mounted to the lift assembly and directly attached to the bottom of the platform of the chain saw assembly providing counter-resistance against the force of the chain saw assembly against the tree or log.

2. The tree or log cutting apparatus of claim 1, wherein the lifting device comprises an angular strip fixedly mounted to the outer frame.

3. The tree or log cutting apparatus of claim 1, wherein the motor is a hydraulic motor.

4. The tree or log cutting apparatus of claim 1, wherein in the lift assembly comprises a cover plate.

5. The tree or log cutting apparatus of claim 1, wherein the chain saw assembly comprises a housing covering the motor.

6. The tree or log cutting apparatus of claim 1, wherein the force absorbing device is a shock absorber.

7. The tree or log cutting apparatus of claim 1, wherein the force absorbing device is a spring.

8. The tree or log cutting apparatus of claim 1, wherein the tree or log cutting apparatus comprises two force absorbing devices.

9. The tree or log cutting apparatus of claim 1, wherein the chain saw assembly further comprises at least one cutting guide.

10. The tree or, log cutting apparatus of claim 9, wherein the cutting guide is fixedly attached to the bar.

11. The tree or log cutting apparatus of claim 9, wherein the cutting guide has a curved shape.

12. The tree or log cutting apparatus of claim 9, wherein at least one stabilizer foot is fixedly attached to the cutting guide and wherein the tree or log cutting apparatus is capable of standing upright upon the stabilizer foot.

13. The tree or log cutting apparatus of claim 1, wherein the tree or log cutting apparatus is configured to be lowered onto the tree or log using manipulating arms of the vehicle.

* * * * *